United States Patent Office 3,091,546
Patented May 28, 1963

3,091,546
TWO COMPONENT PRINTING INK AND METHOD
Charles Schmall, Chicago, Ill., assignor to Continental Can Company, Inc., New York, N.Y., a corporation of New York
No Drawing. Filed Apr. 11, 1961, Ser. No. 102,133
11 Claims. (Cl. 117—45)

This invention relates to the art of printing inks having an alkyd resin therein, and more particularly concerns the preparation of hard films from such inks by a two-component procedure.

It is a practice to decorate metal by application of inks which are then baked. Many inks employed for the purpose deteriorate or discolor badly when subjected to high baking temperatures. For example, the outside decoration for a metal container, such as a can body, may be applied to flat sheets before these are manufactured into cans, and thereafter an inside so-called sanitary lining is applied either to the sheets or to the formed cans; when these sanitary linings are baked, e.g., at temperatures up to 420 degrees F. for 10 to 12 minutes, the vehicle or non-pigment portion of the decoration often breaks down. Inks prepared with high heat resistant resins do not perform satisfactorily on the lithograph press, because they are of hydrophilic nature and require large amounts of hydrophilic thinners to attain a desirable viscosity for printing use, and therewith the ink absorbs an excess of water from the fountain solution, and thus becomes unstable on the press.

According to the present invention, a modified alkyd resin, reduced by a thinner, is employed as the vehicle for the pigment and coloring matter, although itself incapable of drying or setting into a hard film but having excellent thermal stability. After this ink has been applied as a first component to the metal in the desired pattern, an over-coating of a second component is applied, with this second component including an agent compatible and cooperative with the first component but itself not providing a satisfactory ink vehicle because of its hydrophilic character, the brittleness of films thereof, or the need for strong solvents to hold it in dispersed form; noting that such solvents are damaging to rubber rollers and blankets of the printing press by causing swelling and deterioration. Each component has excellent thermal stability.

An object of the invention is a process of preparing thermally stable coatings on metal, with use of an alkyd resin as vehicle for pigment.

Another object is a process of preparing thermally stable coatings on meal, by employment of a first component containing an acid-modified alkyd resin of non-hydrophilic type, followed by an over-coating of a curing agent for the alkyd resin, and by baking, whereby the coatings intermix and provide a dry, hard but non-brittle decorative film.

With these and other objects in view, as will appear in the course of the following description and claims, illustrative practices will be set out.

*Example 1*

An alkyd resin is prepared by reacting a dibasic acid or anhydride with a polyhydroxyl alcohol such as glycerol or pentaerythritol, and modifying with a saturated acid such as the acids from coconut, cottonseed and other non-drying vegetable oils. Such procedures of preparing non-drying-modified alkyd resins are known, and are not claimed specifically herein. The products are available commercially, and are known not to dry or set into hard films by themselves, upon expulsion of any thinner, even when metallic driers are added or when the coated sheet is baked in an oven. They have excellent heat stability. Usable dibasic acid components are phthalic, iso-phthalic, terephthalic, fumaric, maleic, azelaic, adipic and sebacic acids, and corresponding anhydrides.

Such an alkyd resin, with non-drying-modifier therein, is reduced to a desirable viscosity for printing, e.g., by a high boiling, liquid, saturated aliphatic hydrocarbon. High boiling esters, or compound esters, may be used or added. The coloring matter, such as titanium dioxide powder or other pigment, is then dispersed into the thinned vehicle.

An illustrative composition for such first component has a vehicle formed, in parts by weight, of:

| | |
|---|---:|
| Para-tertiary-butyl benzoic acid | 18.6 |
| Coconut oil fatty acids (non-drying) | 21.8 |
| Neopentyl glycol | 11.3 |
| Phthalic anhydride | 17.1 |
| Pentaerythritol | 11.3 |
| Petroleum solvent (boiling range 548–584 degrees F.) | 19.9 |
| Total | 100.0 |

The alkyd resin components are mixed and cooked together to form the modified alkyd compound, which is then reduced to working consistency by the petroleum solvent. Illustratively, the solution has a viscosity of 210 poises at 30 degrees C., and an acid number of 8 to 12. The solution is then milled with a pigment to form a semi-solid printing ink. For a white ink formulation this may be in the proportions by weight:

| | |
|---|---:|
| Titanium dioxide | 55.9 |
| Ultramarine blue toning pigment | 0.1 |
| Non-drying alkyd as described above | 44.0 |
| Total | 100.0 |

Such an ink paste can be applied with a dry or wet lithographic offset printing press, using conventional printing press plates and fountain solution for the wet offset method. During operation, the non-drying character of this first component allows it to be left on the printing press, even with long stoppages, without the hazard of its drying on the rollers or the necessity of washing up immediately even though the next run will include use of the same ink shade.

The second component is applied to the sheet after the first component has been printed thereon; and may be comprised of a low concentration of an amine-aldehyde resin solution. For example, the melamine-formaldehyde resin solution commercially available under the designation No. MM–47 of Rohm and Haas Company, can be employed: it is compatible with the resin in the first component. Such commercial solution contains about sixty percent of solids by weight, with a greater viscosity than desirable for roller coating: accordingly, 5 gallons of the resin solution is mixed with 2 gallons of normal butyl alcohol, wherewith the solids content is reduced to about 40 percent and the viscosity is about sixteen seconds by the conventional No. 4 Ford Cup test, at 77 degrees F., per section D–1200 of the ASTM Standards (1958). A strong solvent is preferred so that there is rapid penetration and mixing of the second component with the already-applied first component: and may be of alcohol, ester or aromatic hydrocarbon type inclusive of butyl alcohol, Cellosolve acetate, toluene, amyl acetate, butyl acetate, amyl alcohol, and mixtures thereof; which dissolve the amine-aldehyde resin, and have solvent penetration into coatings of acid-modified alkyd resins.

The successive applications of the two components can be accomplished by passing the decorated sheet from the printing press with the first component on the sheet, in wet form, immediately to a roller coating machine in which a resilient composition roller receives and applies the second component so that the latter is mixed with the decoration print by the effect of the solvent and the pressure of the applying roller. The roller for the second composition can have a smooth surface; and does not deteriorate in the fashion of a rubber printing roller with its need for sharply defined and maintained printing etc., areas. The sheet with the decoration first component and the curable second component is then dried and baked, e.g., in a gas-fired oven.

When the decoration is to be formed by the display of different colors, the first component is prepared as individual solutions having such different colors, and these solutions are then employed in a multi-color printing operation prior to applying the second component. The entire area need not receive coating by the first component: but only parts thereof, with other parts receiving a coating by other inks, or by a later protective varnish.

Desirable baking temperatures are in the range of 325 to 375 degrees F., for effecting conversion of the blended components, e.g., the thermally setting resin present. For example, baking at 355 degrees F. for 9–10 minutes plate temperature has been utilized, with approximately two minutes oven come-up time. For white inks, the temperature of 375 degrees F. has been found a desirable maximum: but inks which contain strongly tinted pigments may be baked at 400 degrees F. or above, provided that the decorative pattern present does not include areas of light colors.

The ink pigments and coloring matters can be selected according to the color desired or acceptable. Commercial inorganic pigments which are thermally stable and resist sublimation can be employed. Usable organic pigments include the heat resistant lakes.

Illustratively, the first component of a white ink can be applied for a "dry film" weight of about 5.0 milligrams per square inch; and the second component was employed in the range of 0.6 to 1.1 milligrams per square inch on "dry film" weight basis. This represents a ratio of 1:3.4 to 1:6.3 between the amine resins solids of the second component to the alkyd resin solids; that is, the ratio is preferably from 25.6 percent by weight of thermosetting amine-aldehyde resin with 74.4 percent of acid-modified alkyd resin, up to 38.6 percent of the amine-aldehyde resin with 61.4 percent of the alkyd resin.

Upon testing the dried and baked composite film, it is found that intermixing of the components has occurred. The film is firm throughout its thickness, and scratch resistant; when stripped from the metal surface, the underside of the film, which has formed the interface with the metal, is found dry and firm and entirely unlike the soft, undried and unset film formed by baking the first component only. A primary action is a mixing or intermigration of the resin solids components, so that the modified alkyd resin of the decorative first component becomes a plasticizer of the thermosetting amine-aldehyde of the second component, with the latter polymerizing upon heating in the oven, by a mechanism accepted by experts in the art. With some formulations, there can also be a chemical reaction between solids of the two components: but this has not been found necessary for attaining the dry, hard, non-brittle baked film which is highly resistant to the temperatures useful for curing sanitary inner liner coatings; e.g., in the example above, no chemical interaction of the alkyd resin and the amine-aldehyde resin appears to occur. Specimen sheets with the baked conventional white ink decoration, and with the instant two component decoration with the aforesaid components, the decoration in each case including printed lettering in type smaller than elite, were given an inside sanitary gold can lining and then baked at 410 degrees F. for eleven minutes at peak temperature: the conventional ink printing discolored badly, while the instant two-component retained its whiteness and the letters were distinct and clear. Comparably, when the inside sanitary coating is first applied and baked at 410 degrees F. for eleven minutes at peak temperature, and then a conventional white ink was applied and baked, scratches were found on the sanitary coatings of some of the sheets, occurring by the handling and conveying incidental to the later lithographing. As a further comparison, the two components were blended before application: but this blend did not run satisfactorily on the lithographic press.

*Example 2*

A first component was prepared as in Example 1, but with lauric acid instead of coconut oil fatty acids as the modifier. The results, using the same second component and procedure, were essentially the same.

Other organic acid modifiers of the alkyd resin can be employed, besides coconut oil fatty acids and lauric acid. For light or pastel shades, the selected modifying acid should have a low iodine number: thus, the commercial coconut oil acids have an iodine number of around 9 or below, and commercial lauric acid has an iodine number of very nearly zero. The acids (usually mixed) of other non-drying vegetable oils, such as babassu kernel oil and African palm kernel oil, can be used, as well as open chain saturated monobasic fatty acids such as lauric, pelargonic and capric, with 9 to 12 carbon atoms. Cyclic and heterocyclic monocarboxylic acids can be employed, such as perhydroabietic and cyclohexane carboxylic acids. Mixtures of acids may be employed. For such shades, the iodine number of the selected acid should not exceed 20, and preferably is below 10.

The presence of unsaturated double bonds in the selected acid radical (e.g., in oleic, linoleic, linolenic, etc., acids) causes discoloration when the composition is baked in air in a high temperature oven. They are usable as modifiers when shades deeper than pastels are to be formed, e.g., in the ranges from yellows and light blues and light reds to the very dark shades and black. Thus cotton-seed and olive oil acids, and the acids of semi-drying oils, can be used. When thin inks are necessary or desirable, the amount of stearic acid present should be limited. For such deeper shades, the straight chain monobasic acids of 9 to 20 carbon atoms can be employed, along with the above acids.

Other alkyd formulations can be employed, by selecting other polyols, or other dibasic organic acids or anhydrides, or both. Mixtures can be employed. Likewise, the alkyd can be prepared by alcoholysis whereby a natural oil or an ester provides both the polyol and also the acid modifier during the heating to form the alkyd resin.

Other thermosetting or heat-convertible amine aldehyde resins can be employed. Thus, urea-formaldehyde, melamine formaldehyde and other triazine-formaldehyde resins can be employed as solutions in a strong solvent such as butanol.

It will be understood that decoration usually consists of employing several colors in patterns to form backgrounds, pictures, lettering, etc. This can be done by employing at each area a first component of the described type, and having appropriate coloring matter including pigments by multi-colored first components thereon, with an all-over roller coating with the second component, and baking.

The illustrative practices are not restrictive and the invention can be practiced in other ways within the scope of the appended claims.

What is claimed is:

1. The method of providing a dry, hard, nonbrittle coating film upon metal, competent of withstanding a temperature in excess of 400 degrees F. without significant discoloration, which comprises applying a first coating of a solution of an alkyd resin having organic monobasic acid modification and being itself non-drying, applying thereover and while the first coating is in wet form, a second coating of thermosetting amine-aldehyde resin in solution in a strong solvent compatible with the modified alkyd resin, whereby the coatings become blended, and heating to expel solvents and effect polymerization of the amine-aldehyde resin.

2. The method of providing a dry, hard, non-brittle coating film upon metal, competent of withstanding a temperature in excess of 400 degrees F. without significant discoloration, which comprises applying a first coating of an alkyd resin having modification by a monobasic organic acid with an iodine number not exceeding 20, said coating being itself non-drying, said modified alkyd resin being applied as a solution in a saturated aliphatic high boiling solvent, applying thereover and while the first coating is in wet form, a coating of thermosetting amine-aldehyde resin in solution in a strong organic solvent compatible with the modified alkyd resin, whereby the coatings become blended, the coatings being essentially in the ratio by weight of 25 to 39 percent of the amine-aldehyde resin and 75 to 61 percent of the modified alkyd resin, and heating to expel solvents and effect polymerization of the amine-aldehyde resin in the presence of the modified alkyd resin as a plasticizer thereof.

3. The method of applying a dry, hard, non-brittle decorative coating film upon metal, competent of withstanding a temperature in excess of 400 degrees F. without significant discoloration, which comprises applying a first coating of a solution of an alkyd resin having organic monobasic acid modification and being itself non-drying, said first coating having particles of a pigment therein, applying thereover and while the first coating is in wet form, a second coating of a thermosetting amine-aldehyde resin in solution in a strong solvent compatible with the first coating, whereby the coatings become blended, and heating to expel solvents and effect polymerization of the amine-aldehyde resin.

4. The method as in claim 3, in which the first coating is applied over selected parts of the metal area to be decorated, by solutions of the modified alkyd resin having different colors employed at different parts of said area to form the decorative pattern, and in which the second coating is provided by roller application over the entire decorated area while the first coating is till wet with solvent.

5. The method of providing a hollow metal body with an external decorative film and an internal coating of enamel baked at a temperature in excess of 400 degrees F., which comprises applying to the surface which is to form the exterior of the body a first coating of solutions of an alkyd resin having organic monobasic acid modification and being itself non-drying, with local parts of the area of said surface being provided by first coating solutions having differentiating coloring components therein, applying thereover and while the first coating is in wet form, a second coating of a thermosetting amine-aldehyde resin in solution in a strong solvent compatible with the solutions of the first coating, whereby the coatings become blended, heating to expel solvents and effect polymerization of the amine-aldehyde resin in the presence of the modified alkyd resin as a plasticizer therefor, thereafter applying an organic enamel solution to the surface for the interior of the body, and baking the same at a temperature in excess of 400 degrees F.

6. The method as in claim 5, in which the decoration is to include a light shade, in which the said organic monobasic acid modifier has an iodine value below 20.

7. The method as in claim 5, in which the ratio of coatings applied, on the basis of weight of solids components, is from 25 to 39 percent of the second coating to 75 to 61 percent of the first coating.

8. The method as in claim 5, in which the said organic monobasic acid is a straight chain saturated aliphatic acid.

9. The method as in claim 5, in which the said organic monobasic acid modifier is a mixture of coconut oil acids.

10. The method as in claim 5, in which the said organic monobasic acid modifier is lauric acid.

11. The method as in claim 5, in which the amine-aldehyde resin is a melamine-formaldehyde resin.

References Cited in the file of this patent

UNITED STATES PATENTS

| | | |
|---|---|---|
| 2,299,547 | Letteron | Oct. 20, 1942 |
| 2,538,378 | Overton | Jan. 16, 1951 |
| 2,852,476 | Cummings | Sept. 16, 1958 |
| 2,937,153 | Rasmussen et al. | May 17, 1960 |
| 3,008,409 | Wentworth et al. | Nov. 14, 1961 |

UNITED STATES PATENT OFFICE

CERTIFICATE OF CORRECTION

Patent No. 3,091,546            May 28, 1963

Charles Schmall

It is hereby certified that error appears in the above numbered patent requiring correction and that the said Letters Patent should read as corrected below.

Column 1, line 51, for "meal" read -- metal --; column 6, line 1, for "till" read -- still --.

Signed and sealed this 21st day of April 1964.

(SEAL)
Attest:

ERNEST W. SWIDER
Attesting Officer

EDWARD J. BRENNER

Commissioner of Patents